US006561705B2

(12) United States Patent
Adam

(10) Patent No.: US 6,561,705 B2
(45) Date of Patent: May 13, 2003

(54) PHOTO-FINISHING

(75) Inventor: Henry H. Adam, Bedfordshire (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/059,984

(22) Filed: Jan. 29, 2002

(65) Prior Publication Data

US 2002/0114630 A1 Aug. 22, 2002

(30) Foreign Application Priority Data

Feb. 16, 2001 (GB) .............................................. 0103834

(51) Int. Cl.[7] ........................ G03D 13/00; G03D 17/00; G03B 27/52

(52) U.S. Cl. .......................... 396/578; 396/599; 355/40

(58) Field of Search .............................. 355/27–29, 40, 355/41, 77; 396/564, 567–570, 578, 599

(56) References Cited

U.S. PATENT DOCUMENTS

| | | | | | |
|---|---|---|---|---|---|
| 5,703,701 | A | * | 12/1997 | Yamamoto et al. | 355/41 |
| 5,874,205 | A | | 2/1999 | Bourdelais et al. | 430/496 |
| 5,984,445 | A | * | 11/1999 | Morita et al. | 396/564 |
| 6,048,111 | A | | 4/2000 | Kurumisawa et al. | 396/622 |
| 6,050,733 | A | * | 4/2000 | Yamamoto | 355/40 |
| 6,174,094 | B1 | * | 1/2001 | Manico et al. | 396/604 |
| 6,181,409 | B1 | * | 1/2001 | Calhoun | 355/39 |
| 6,412,990 | B1 | * | 7/2002 | Stoffel et al. | 396/599 |

* cited by examiner

*Primary Examiner*—D Rutledge
(74) *Attorney, Agent, or Firm*—Frank Pincelli

(57) ABSTRACT

A method of identifying whether a particular brand of photochemicals has been used in the processing of photographic prints by providing information relating to the process chemistry on the back of the prints.

5 Claims, No Drawings

PHOTO-FINISHING

FIELD OF THE INVENTION

This invention is directed towards the provision of photo-finishing goods and/or services. In particular the invention relates to a method of providing assurance that a particular photo-finishing process has been used.

BACKGROUND OF THE INVENTION

Manufacturers of photographic equipment and supplies, such as Eastman Kodak Company, license their brand name to retail and wholesale photo-finishing sites. A retail photo-finishing site has on-site equipment, such as a mini-lab, to locally produce photo-finishing services directly to a consumer. A wholesale photo-finishing site receives photo-finishing orders from a plurality of distributed outlets which do not have their own on site photo-finishing equipment.

In order to protect the brand name it is important that the level of quality is controlled.

The quality of photographic prints is extremely important to the consumer. Photographs are often treasured possessions, holding memories of important events to the consumer. Taking in exposed film for developing and ending up with poor quality prints can be very upsetting for the consumer, especially if the pictures taken were of a one off event which cannot be repeated. It is important that the retailers entrusted with developing the prints are seen to provide consistently high quality results. If the prints are not of a good quality they will lose custom. One of the important elements of the processing of photographic prints is the quality of the photochemicals used in the development process. If the chemicals are not of a good quality the resulting prints will not be satisfactory regardless of whether or not good quality photographic paper is used. At the moment there is no way that a consumer can know what process and which chemicals are used. There is therefore no way for a consumer to choose a retailer on this basis and it is a matter of trial and error to find a retailer that can provide consistently good quality prints.

SUMMARY OF THE INVENTION

It is an aim of the invention to provide a method of providing assurance that a consistently high quality of prints can be produced by the retailer. The invention provides information relating to the process chemistry used. The invention provides a method of identifying that a particular brand of process chemistry has been used in the development of the photographic prints.

According to the present invention there is provided a method of identifying whether a particular brand of photochemical has been used in the processing of photographic prints by providing information relating to the process chemistry on the back of the prints.

The invention also provides a method of providing assurance as to the quality of photographic prints by ensuring that a particular brand of processing chemistry has been used in the development of the prints.

The invention further provides a method of advertising a brand of photochemicals by identifying the brand on the back of photographic prints that have been processed using that brand of photochemicals.

The invention yet further provides a method of supplying a photofinishing order including the steps of accepting an order from a consumer, developing the order, printing the order and returning the order to the consumer, wherein the step of printing further includes printing an identifiable indication of the brand of photochemicals used on the back of the photofinishing order.

The invention yet further provides a method of supplying a photofinishing order including the steps of accepting an order from a consumer, developing the order, printing the order and returning the order to the consumer, wherein the order is printed on photographic paper the reverse side of which has been pre-printed with an identifiable indication of the brand of photochemicals used in the development process.

The invention yet further provides a photo-processing apparatus for processing photographic material, the apparatus being adapted to print information regarding the chemicals used in the process on the reverse of the final photographic print.

At the present time there is no way by which a consumer can know which brand of process chemistry has been used in the processing of his or her prints. The present invention provides this knowledge. The consumer may then take their prints to a photofinisher whom they know will be using the brand of process chemistry which gives good quality results. Hence the quality of the prints will be guaranteed. This can provide significant advantages to the photofinisher who can attract more consumers and to the proprietor of the process chemistry who can sell more photochemicals.

DETAILED DESCRIPTION OF THE INVENTION

Manufacturers of photographic paper, both for color and monochrome prints, often print their brand name on the reverse side of the paper. This is known as back-printing. This allows the customer to identify the brand of paper that has been used to make the prints belonging to that customer. As well as brand information the back of the paper may be decorated with material that will identify the paper with a particular event or such like. The back of the paper may also be used to advertise particular photographers. It could also be supplied with copyright information to inform consumers of their obligations under copyright law. However, this printing on the reverse side of the paper provides no indication of which brand of process chemistry has been used in the development.

Back-printing of the photographic paper may be done when the paper is being manufactured. Examples include inking ribbon printers, thermal printers and inkjet printers. A digital method of printing can also be used. Examples include ink jet printing and thermal dye transfer printing.

Recently it has been possible to provide additional information on the back of prints. This information can be the date of printing and other information associated with the film being processed. For example, with Advanced Photographic System films, APS, the information is derived from the magnetic information held on the film. This information is added to the back of the photographic paper before it goes into the developer solution, after the paper has been exposed by shining light through the negatives of the film.

The present invention provides a method of identifying that certain photochemicals have been used in the development of the prints. As explained above this has significant advantages for both the retailer and the consumer. One way of doing this is to print the pack of the photographic print with this information. This could be done at the same time as the paper is manufactured or at any time during the production of customer prints. In the former method the supplier of the paper must be contractually obliged to supply the pre-printed paper only to those retailers or wholesalers which use the brand of photochemicals identified on the paper. The retailers and wholesalers must be contractually obliged to use the pre-printed paper only with the particular brand of photochemicals identified. There is also a contractual agreement in the latter, preferred, method of printing the paper just prior to development of the exposed film.

In this latter method the photographic paper is exposed to light through the negatives of the film. The paper is then back-printed with the brand name of the photochemicals or another indication of the brand of photochemicals before going into the developer solution. The retailer or wholesaler must own processing equipment with backprinting capability to enable this embodiment of the invention.

The proprietor of the process chemistry can enter into an agreement with the customer providing the processing service, i.e. the retailer or wholesaler, to identify that the prints have been developed using particular processing chemistry. This will act as a guarantee of the quality of the prints. This can provide a marketing advantage for both the supplier of the process chemistry and the retailer/wholesaler.

Of course it will be appreciated that the printing does not have to specifically state that a particular brand of chemicals have been used. It will be sufficient to print some sort of symbol or trademark provided that this signifies to the consumer that those particular chemicals have been used. This could be by way of an advertisement campaign aimed at the consumer in which the symbol is promoted as a statement to the effect that the advertiser's brand of chemicals has been used in the processing of the film.

The manufacturer or the supplier of the brand of photochemicals approaches the retail and wholesale photofinishing sites or vice versa An agreement is concluded in which the retailers and wholesalers agree to use only the photochemicals supplied by the supplier with the indication that those photochemicals have been used.

By having a contractual agreement associated with the supply of the photochemicals to the retailer or wholesaler it is possible to indicate to the final consumer that the particular photochemicals are used in that process. Thus the consumer can be assured of being provided with consistently high quality prints from that retailer or wholesaler. The consumer does not have to remember where he took previous films for developing as the backprinting provides a permanent reminder.

In addition to providing assurance as to quality of output photographs the brand indicator could also be useful for other attributes of the chemicals. For example, if a particular brand of chemical has been found to be more environmentally friendly than another brand consumers may wish to have their film developed using this brand and to have this fact indicated on the finished product.

What is claimed is:

1. A method of identifying whether a particular brand of photochemical has been used in the processing of photographic prints by providing information relating to the process chemistry on the back of the prints.

2. A method of advertising a brand of photochemicals by identifying the brand on the back of photographic prints that have been processed using that brand of photochemicals.

3. A method of supplying a photofinishing order including the steps of accepting an order from a consumer, developing the order, printing the order and returning the order to the consumer, wherein the step of printing further includes printing an identifiable indication of the brand of photochemicals used on the back of the photofinishing order.

4. A method of supplying a photofinishing order including the steps of accepting an order from a consumer, developing the order, printing the order and returning the order to the consumer, wherein the order is printed on photographic paper the reverse side of which has been pre-printed with an identifiable indication of the brand of photochemicals used in the development process.

5. A photo-processing apparatus for processing photographic material, the apparatus being adapted to print information regarding the chemicals used in the process on the reverse of the final photographic print.

* * * * *